United States Patent
Terakado

(10) Patent No.: US 9,235,362 B2
(45) Date of Patent: Jan. 12, 2016

(54) PRINTER CONVERTS PRINT DATA INTO ONE OR TWO DIMENSIONAL CODE IS CAPABLE OF CARRYING OUT PRINTING AGAIN BASED ON THE ONE OR TWO DIMENSIONAL CODE

(71) Applicant: TOSHIBA TEC KABUSHIKI KAISHA, Shinagawa-ku, Tokyo (JP)

(72) Inventor: Kazuya Terakado, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/289,052

(22) Filed: May 28, 2014

(65) Prior Publication Data

US 2015/0347061 A1 Dec. 3, 2015

(51) Int. Cl.
*H04N 1/17* (2006.01)
*G06F 3/12* (2006.01)
*G06K 7/10* (2006.01)

(52) U.S. Cl.
CPC .............. *G06F 3/122* (2013.01); *G06F 3/1222* (2013.01); *G06F 3/1271* (2013.01); *G06K 7/10* (2013.01)

(58) Field of Classification Search
CPC .................. H04N 1/32144; H04N 2201/3269; H04N 1/327
See application file for complete search history.

(56) References Cited

U.S. PATENT DOCUMENTS

| | | | |
|---|---|---|---|
| 2006/0044608 A1* | 3/2006 | Harada | 358/1.15 |
| 2011/0242574 A1* | 10/2011 | Soriano et al. | 358/1.14 |
| 2011/0309138 A1* | 12/2011 | Wu et al. | 235/375 |
| 2012/0147396 A1* | 6/2012 | Kobayashi et al. | 358/1.9 |
| 2013/0176590 A1* | 7/2013 | Shiraishi | 358/1.15 |

FOREIGN PATENT DOCUMENTS

| | | |
|---|---|---|
| JP | 2001-334692 | 12/2001 |
| JP | 2009-083148 | 4/2009 |

* cited by examiner

*Primary Examiner* — Martin Mushambo
*Assistant Examiner* — Haris Sabah
(74) *Attorney, Agent, or Firm* — Amin, Turocy & Watson, LLP

(57) ABSTRACT

A printer, which is capable of receiving printing data from a host, converting the printing data into a code and executing printing based on the code, is further capable of storing the code and executing printing based on the stored code.

7 Claims, 4 Drawing Sheets

PRINTER CONVERTS PRINT DATA INTO ONE OR TWO DIMENSIONAL CODE IS CAPABLE OF CARRYING OUT PRINTING AGAIN BASED ON THE ONE OR TWO DIMENSIONAL CODE

FIELD

Embodiments described herein relate to a printer which is capable of carrying out printing again by the single body of the printer.

BACKGROUND

Conventionally, a printer carries out a flow of receiving data from a host such as a PC, carrying out a command processing inside the printer itself and then carrying out printing on paper such as a label.

However, in order to carry out printing again, it is necessary to send, from the host, new data desired to be printed by the printer, which is troublesome.

DETAILED DESCRIPTION

In accordance with one embodiment, a printer apparatus, which is a printer capable of receiving printing data from a host, converting the printing data into a code and executing printing based on the code, can store the code and execute printing based on the stored code.

Hereinafter, the embodiments are described in detail with reference to the accompanying drawings.

A First Embodiment

Figure 1:
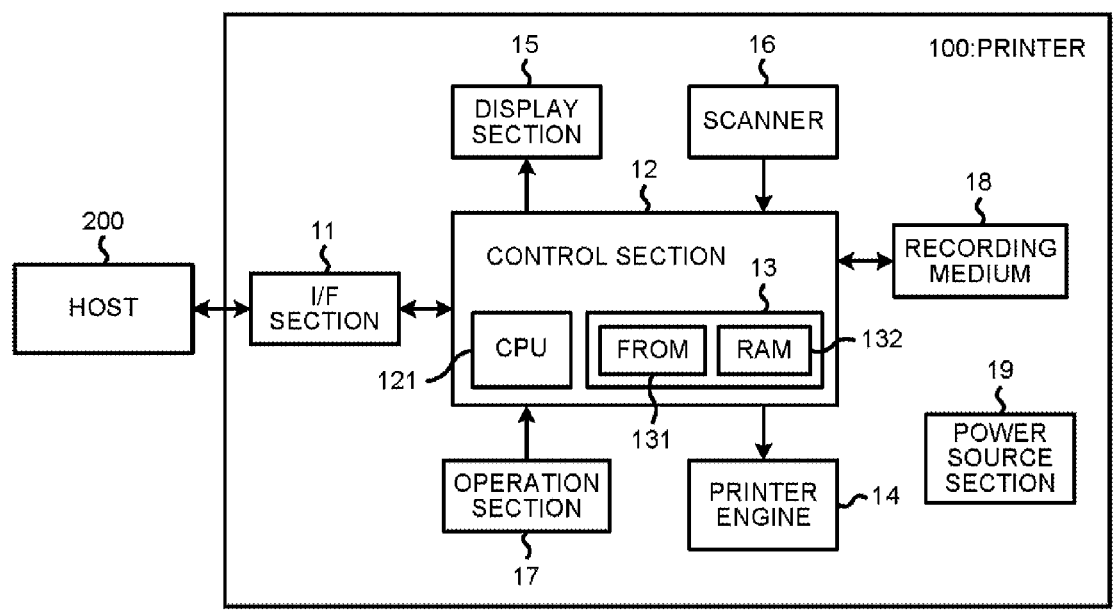
FIG. 1 is a system constitution diagram illustrating a printer according to a first embodiment.

FIG. 1 is a system constitution diagram illustrating a printer according to a first embodiment.

A printer 100 is connected with an I/F section (not shown) of a host 200 through an I/F (interface) section 11. The printer 100 may be, for example, a thermal printer and a printing medium may be, for example, a label temporarily attached to a roll-type mount. The printing medium, which is not limited to label, may be a tag or a sheet and the like. The host 200, which is, for example, a PC (Personal Computer) and the like, is capable of sending printing command data and printing data to the printer 100. The printer 100 and the host 200 are arranged separately.

In addition, the command data is obtained by converting the printing data into a two-dimensional code. For example, a QR (Quick Response) code may be used as the two-dimensional code. The present invention is not limited to the two-dimensional code, for example, a one-dimensional code such as a barcode may also be used. As the information recording capacity of the barcode is low, a code with high information recording capacity is preferred according to the use purpose.

The printer 100 consists of a control section 12, a memory section 13, a printer engine 14, a display section 15, a scanner 16, an operation section 17, a recording medium 18 and the like.

The I/F section 11 is an interface such as a cable LAN (Local Area Network) or a wireless LAN which is connected with the host 200 and is capable of carrying out an external control. The printer 100 may operate independently.

The control section 12 is a control substrate for operating the printer 100. The control section 12 is provided with a CPU (Central Processing Unit) 121 for carrying out various processing in the printer 100.

The memory section 13 consists of a FROM (Flash Read Only Memory) 131, a RAM (Random Access Memory) 132 and the like. The main firmware and the character generator of the printer 100 are stored in the FROM 131. Various parameters used in the control of the printer operation and the content relating to the registration of the printer are stored in the FROM 131. The main firmware of the FROM 131 controls the whole printer 100 and reads font data from the character generator in which the font data and the like is stored.

The printing data and the like is temporarily stored in the RAM 132. The CPU 121 executes the firmware stored in the main firmware and reads the font data stored in the character generator.

The printer engine 14 consists of a head and a substrate for the printing of the printer, a heat sink and the like. The printer engine 14 further includes a stepping motor, a DC motor and the like for driving the internal mechanism and for conveying the printed paper.

The control section 12 drives the printing head of the printer engine 14 based on the printing data read from the character generator of the FROM 131. The control section also drives a carriage (not shown) for enabling the printing head of the printer engine 14 to scan and drives a conveyance mechanism for conveying the sheet.

The display section 15 includes a function of visually presenting information to a user and drawing the attention of the user. For example, the display section 15 consisting of a LCD or LED and the like includes functions of displaying printing image, a menu or character under operation, ON/OFF state of the power source of the machine. The display section 15 can be used both as an operation section and a display section by including a touch panel function in the display section 15.

The scanner 16 moves on the surface of paper loaded on a document table to read an image of the document on the document table. The read optical image is photoelectrically converted by, for example, a CCD (Charge Coupled Device), and is subjected to a given processing in an image processing section (not shown), and then is output to the control section 12 as the printing data.

The operation section 17 consists of a user interface such as a key, a touch panel and the like. The signal input through the operation section 17 is sent to the CPU 121 of the control section 12. The control section 12 controls the operation of the printer 100 and carries out mode setting according to the state of the operation section 17.

The recording medium 18 is detachable image recording media or image recording media incorporated in the printer 100, and is a writable and erasable high-capacity storage device such as a memory, HDD (Hard Disc Drive), DVD (Digital Versatile Disc) and the like. The captured and processed image data is stored in the recording medium 18.

The power source section 19 supplies power required to carry out the operation of the printer. The power source section 19 converts the AC power source into various required DC power sources in the printer 100, and supplies voltage for each block.

The control section 12 of the printer 100 with such a constitution temporarily stores the printing data received from the host 200 in the RAM 132. Meanwhile, the control section 12 converts the command data sent together with the printing data into a QR code 23 and temporarily stores the code in the RAM 132.

When a printing operation is carried out from the operation section 17, the control section 12 converts the QR code 23 temporarily stored in the RAM 132 into the printing data and then carries out the printing processing. Then, the control Section 12 drives the printer engine 14 to carry out printing on a label 22 attached to a mount 21 shown in FIG. 2, and then discharges the label. The QR code 23 is printed, for example, at the lower right.

In a case where the capacity of the printing data is large, the printing data is compressed in advance, and then the compressed data is converted into the QR code 23. In a case of converting the compressed data into the QR code, the control section 12 decompresses when reading the QR code, and prints the data after decompression as the QR code. In addition, as to the compressed information, a method is considered in which data is added to, for example, the printer 100, and it is determined that the data is compressed data if a flag erects thereof, and then a decompression processing is carried out.

This is an effective method when the printing information is the content with confidentiality.

Figure 3:
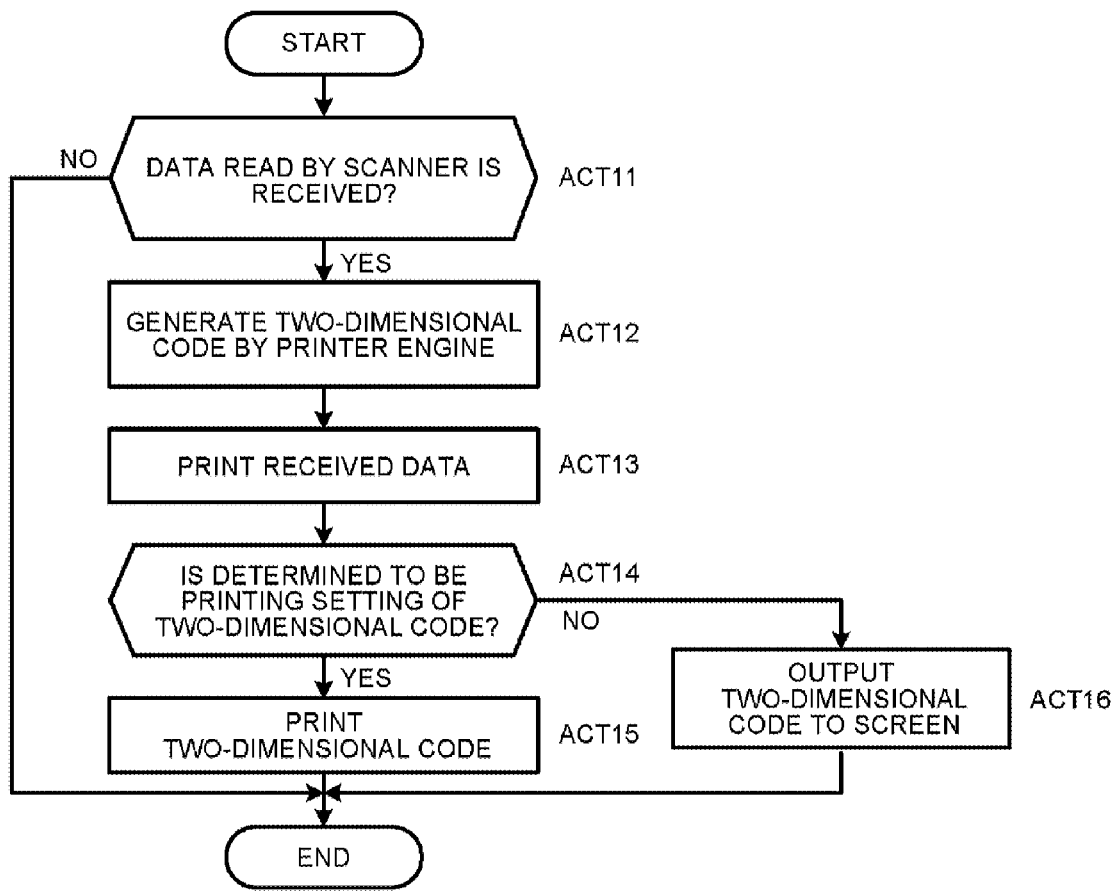
FIG. 3 is a flowchart illustrating the operations carried out in the first embodiment.

FIG. 3 is a flowchart illustrating the operations carried out to generate the two-dimensional code according to the printing data of the paper medium.

Figure 2:
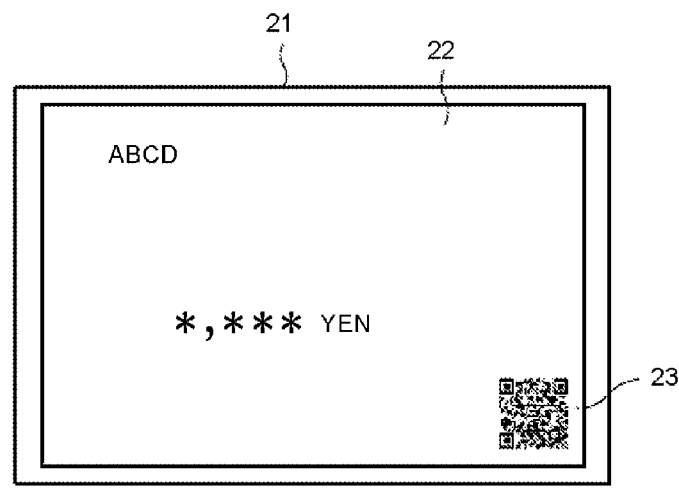
FIG. 2 is a diagram illustrating a printing example of the printer shown in FIG. 1.

The flowchart illustrating a processing of reading the QR code 23 printed on the label 22 shown in FIG. 2 with the scanner 16, and generating, printing and displaying a new QR code.

Figure 4:
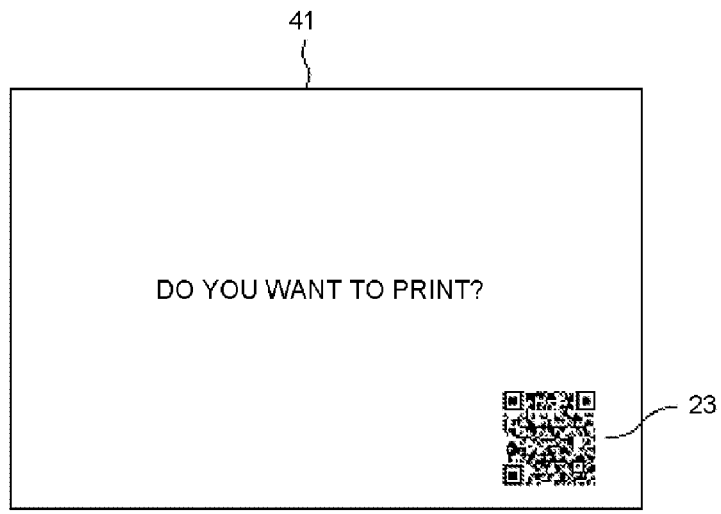
FIG. 4 is a diagram illustrating an example of the display on the printer shown in FIG. 1.

First, an operator operates the operation section 17 and drives the scanner 16 to read the label 22. As shown in FIG. 4, the control section 12 displays a message of, for example, "Do you want to print?" on the display section 15. The operator touches either of "YES" and "NO" (not shown) displayed on the screen of the display section 15.

According to this operation, the scanner 16 reads, for example, the printing information of the label 22 shown in FIG. 2. The printing data read by the scanner 16 is sent to the control section 12, and it is determined whether or not the read data is received (ACT 11).

The control section 12 generates the QR code 23 by the printer engine 14 based on the read printing data of the label 22 (ACT 12). The generated QR code 23 is temporarily stored in the FROM 131.

The control section 12 drives the printer engine 14, reads the font data based on the QR code 23 stored in the FROM 131, converts the data into printing data and then executes printing (ACT 13).

Next, it is determined whether or not the content of the operation from the operation section 17 is the printing setting of the QR code 23 (ACT 14).

If it is determined that the content is the printing setting of the QR code 23 (YES in ACT 14), the flow proceeds to ACT 15.

In ACT 15, the control section 12 drives the printer engine 14, and reads, from the character generator, the font data based on the QR code 23 from the FROM 131, and then prints the data on, for example, the label 22.

If it is determined that the content is not the printing setting of the QR code 23 (NO in ACT 14), the flow proceeds to ACT 16. The control section 12 displays the QR code 23 temporarily stored in the RAM 132 on the screen of the display section 15.

The printing data sent from the host 200 is printed on the paper medium through the processing in ACT 11~16, then it is possible to print, independently of the host 200, the content on the label 22 or the content displayed on the screen of the display section 15.

In the present embodiment, after printing is carried out once according to the command from the host, it is possible to generate the printing data based on the QR code and print the printing data on the label without receiving a command from the host.

A Second Embodiment

Figure 5:
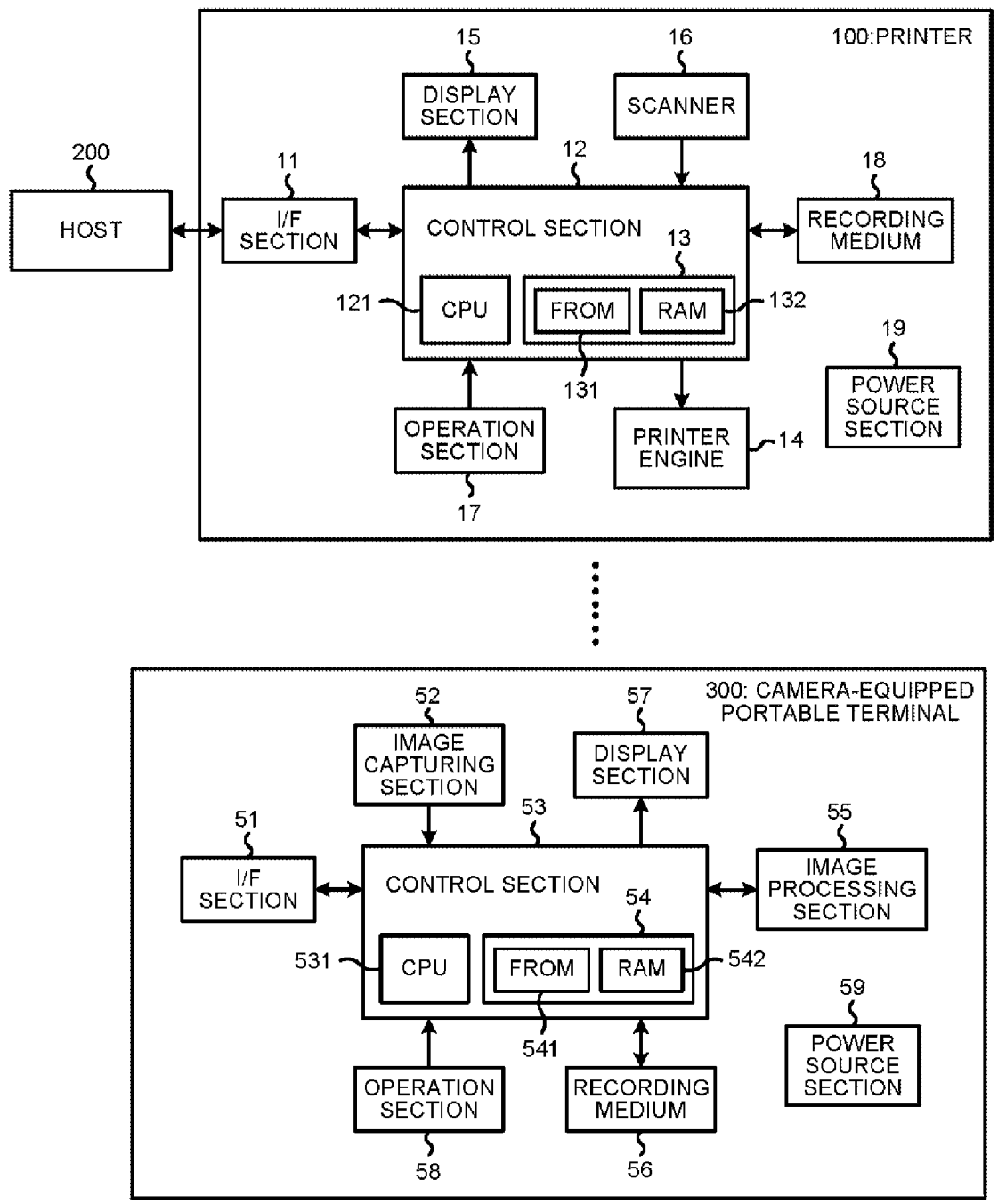
FIG. 5 is a system constitution diagram illustrating a printer according to a second embodiment.

FIG. 5 is a system constitution diagram illustrating a printer according to a second embodiment. In the second embodiment, the QR code is not limited to be printed on the paper medium, it may also be carried by a camera-equipped portable terminal, and the printing can be carried out even with a printer which is not connected with the host. In addition, the same components as the first embodiment are endowed with the same reference mark, and the different parts are mainly described below.

In FIG. 5, the printer 100 is connected with an I/F section (not shown) of the host 200 and an I/F section 51 of a camera-equipped portable terminal 300 through an I/F (interface) section 11. The printer 100, the host 200, and the camera-equipped portable terminal 300 are arranged separately.

The constitution of the camera-equipped portable terminal 300 is described. For example, a smart phone or a digital camera may be used as the camera-equipped portable terminal 300.

The camera-equipped portable terminal 300 comprises an I/F section 51, an image capturing section 52, a control section 53, a memory section 54, an image processing section 55, a recording medium 56, a display section 57, an operation section 58 and the like.

The image capturing section 52 consists an optical unit including an image area sensor such as a COD/CMOS (Complementary Metal Oxide Semiconductor) and a lens. The captured image data is sent to the image processing section 55 through the control section 53.

The control section 53 is a control substrate for operating the camera-equipped portable terminal 300. The control section 53 takes a CPU 531 for carrying out various controls of the camera-equipped portable terminal 300 as a core, and carries out various image processing/conversion on the image data from the image capturing section 52 and the image data from the recording medium 56, and then generates display data and recording data.

The memory section 54 consists of a FROM 541, a RAM 542 and the like. The FROM 541 stores the main firmware and the character generator of the camera-equipped portable terminal 300. The RAM 542 is used by the control section 53 to temporarily store the printing data and the like. The CPU 531 executes the firmware stored in the main firmware and reads the font data stored in the character generator.

The I/F section 51 is an interface such as a cable LAN or a wireless LAN which is connected with the printer 100 and is capable of carrying out an external control. The I/F section 51 can be connected with the I/F section of the host 200.

The image processing section 55 carries out various image processing/conversion on the image data from the image capturing section 52 and the image data from the recording medium 56, and then generates display data and recording data.

The recording medium 56 is detachable image recording media or image recording media such as a memory incorporated in the printer, and is a writable and erasable high-capacity storage device. The image data which is captured and processed by the image processing section 55 is stored in the recording medium 56.

The display section 57 includes a function of visually presenting information to a user and drawing the attention of the user. For example, the display section 57 consisting of a LCD or LED and the like includes members for displaying printing image, a menu or character under operation, ON/OFF state of the power source of the machine. The display section 57 can be used both as an operation section and a display section by including a touch panel function in the display section 57.

The power source section 59 includes an I/F connecting with a battery or an external power source, and supplies desired voltage for each block device.

Figure 6:
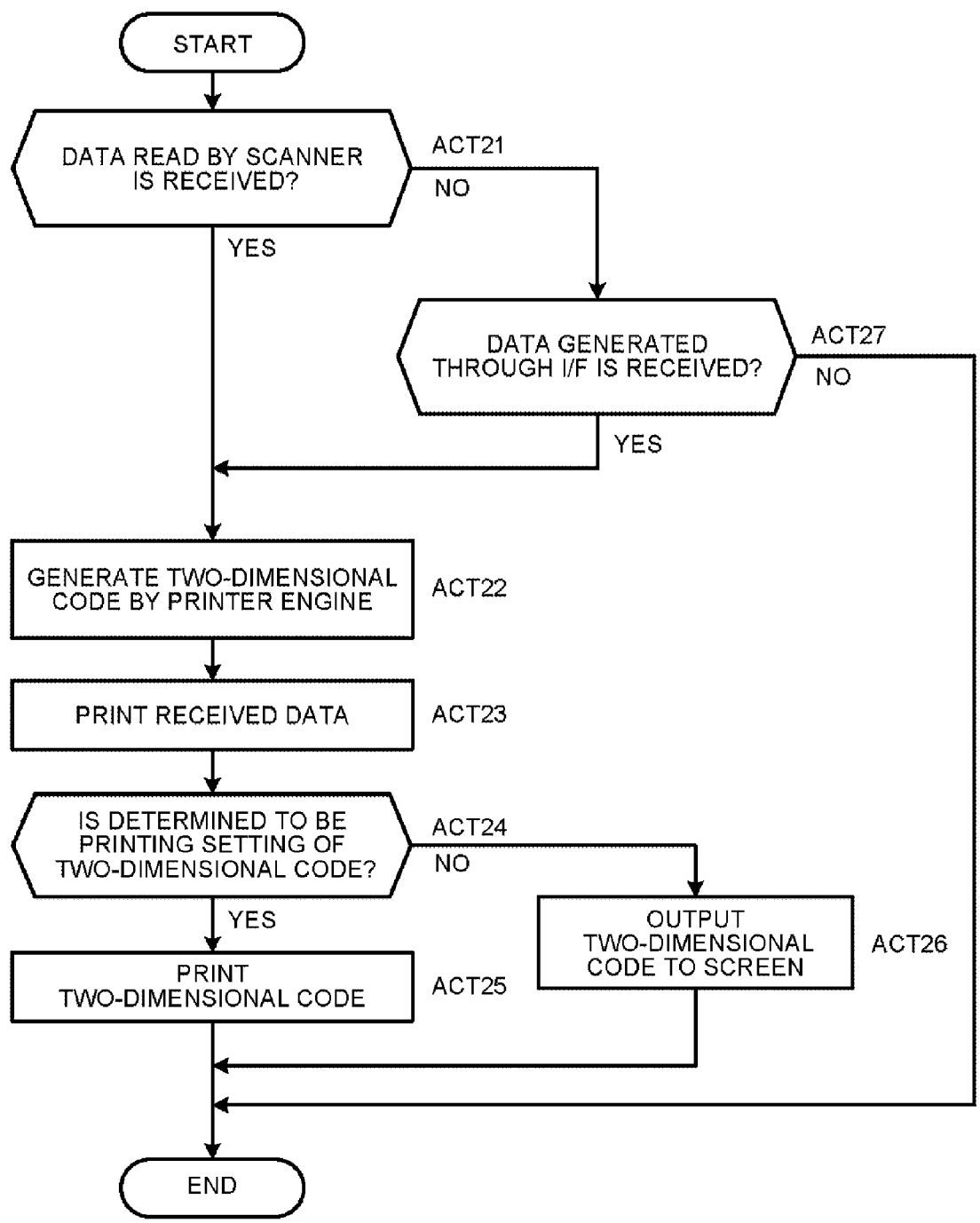
FIG. 6 is a flowchart illustrating the operations carried out in the second embodiment.

FIG. 6 is a flowchart illustrating the operations carried out to generate and print the two-dimensional code based on the printing data of the paper medium or to generate and print the two-dimensional code based on the printing data stored in the portable terminal.

First, the operator operates the operation section 17 and drives the scanner 16 to read the label 22. The control section 12 displays a message of, for example, "Do you want to print?" on the display section 15. The operator touches either of "YES" and "NO" (not shown) displayed on the screen of the display section 15.

The control section 12 determines whether or not the printing data which is received after "YES" on the display section 15 is touched is the data read by the scanner 16 from the label 22 (ACT 21).

If it is determined that the received data is the data read by the scanner 16 (YES in ACT 21), the QR code 23 is generated by the printer engine 14 based on the read printing data of the label 22 (ACT 22). The generated QR code 23 is temporarily stored in the FROM 131.

The control section 12 drives the printer engine 14, reads the font data based on the QR code 23 stored in the FROM 131, converts the data into printing data and then executes printing (ACT 23).

Next, it is determined whether or not the content of the operation from the operation section 17 is the setting for printing the QR code 23 (ACT 24).

If it is determined that the content is the setting for printing the QR code 23 (YES in ACT 24), the flow proceeds to ACT 25.

In ACT 25, the control section 12 drives the printer engine 14, and reads, from the character generator, the font data based on the QR code 23 from the FROM 131, and then prints the data on, for example, the label 22.

If it is determined that the content is not the setting for printing the QR code 23 (NO in ACT 24), the flow proceeds to ACT 26. The control section 12 displays the QR code 23 temporarily stored in the RAM 132 on the screen of the display section 15.

In ACT 21, if it is determined that the received data is not the data read by the scanner 16 (NO in ACT 21), the flow proceeds to ACT 27.

In ACT 27, the control section 12 determines whether or not the received printing data is the data generated through the I/F section 11.

If it is determined that the received data is the printing data generated through the I/F section 11 (YES in ACT 27), the flow proceeds to ACT 22 and then executes the processing in ACT 23~26. If it is determined that the received data is not the printing data generated through the I/F section 11 (NO in ACT 27), the processing is ended.

Through each processing in ACT 21~27 described above, the QR code 23 based on the printing data sent from the camera-equipped portable terminal 300 to the printer 100, or the QR code 23 based on the printing data read by the scanner 16 can be generated separately.

In this way, the printer 100 generates the QR code according to the printing data read by the scanner 16. Further, the printer 100 generates the QR code according to the printing data which is received from the camera-equipped portable terminal 300 and generated through the I/F section 11. The control section 12 generates the printing data based on the QR code 23. The printer 100 can carry out printing according to the printing data generated based on the QR code 23.

The printing data which is received from the host 200 once is converted into the QR code 23 and then printed on the label 22. Alternatively, the printing data of the paper medium or the printing data acquired through an image capturing operation performed by the image capturing section 52 of the camera-equipped portable terminal 300 is converted into the QR code in the printer 100 and then printed on the label 22. The printing information can also be displayed on the display section 15 of the printer 100 as well as be printed.

Further, in a case where the printing data created in external device is stored in the form of QR code 23, it is possible to directly read the code by the scanner 16 of the printer 100 and then print the code. The scanner may be installed inside the printer 100 or installed as an external device. Even in a case of desiring to move the setting information of the printer 100 to other printer, a QR code 23 can be generated, and then other printer reads the code, thereby moving the information.

In the present embodiment, it is exemplified that the QR code is stored by being printed on the paper medium or being captured by the portable terminal. In this way, through the moving of printing the printing data which is received from the host once, it is possible to carry out printing by the single body of the printer, which improves the convenience.

The present invention is not limited to the embodiments described above. For example, in a case of carrying out printing and issuing based on the two-dimensional code, the printing data stored in the printer is deleted automatically after the printing and issuing. Further, when the power source of the printer is turned ON or OFF, the printing data temporarily stored in the printer is deleted automatically. The printing data in the printer is deleted after the printing is carried out, thus, the confidentiality can be improved.

Further, when the printing data is converted into the two-dimensional code, an encryption processing is carried out so that the code can merely be decoded by a specified printer and cannot be decoded by the printer different from the specified printer. In this way, the information can be prevented from being divulged. In this case, the specified printer is set as the printer receiving the printing data from the host. In this way, other printer is not specified, which can prevent the printing data with confidentiality from being divulged when being passed around.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printer, which is receiving printing data that facilitates printing from a host, converting the printing data into a one dimensional code or a two dimensional code and executing the printing based on the printing data associated with the one dimensional code or the two dimensional code, is further of: storing the one dimensional code or the two dimensional code:
   executing the printing based on the stored one dimensional code or the two dimensional code, which generated based on the printing data, and
   when the printing data is converted into the one dimensional code or the two dimensional code, an encryption processing of the one dimensional code or the two dimensional code is carried out so that an encrypted code can only be decoded by the printer that receives the printing data from the host and cannot be decoded by another printer different from the printer.

2. The printer according to claim 1, wherein the one dimensional code or the two dimensional code is stored in a paper medium or an external terminal.

3. The printer according to claim 2, wherein in a case of storing the one dimensional code or the two dimensional code in the external terminal, the external terminal is connected with the printer through a wired or wireless LAN.

4. The printer according to claim 2, wherein
   the external terminal is a camera-equipped portable terminal.

5. The printer according to claim 1, wherein the one dimensional code or the two dimensional code is generated by converting the printing data from the host.

6. The printer according to claim 1, wherein the printing data in the printer which carries out the printing based on the one dimensional code or the two dimensional code is deleted after the printing.

7. The printer according to claim 6, wherein the printing data which is deleted after the printing is completed when power source of the printer is turned ON or OFF.

* * * * *